United States Patent
Fant

(10) Patent No.: US 6,496,509 B1
(45) Date of Patent: Dec. 17, 2002

(54) SYSTEM FOR TRANSMITTING DATA PACKETS BETWEEN COMPUTERS VIA AN IEEE-1394 NETWORK MEDIUM

(75) Inventor: Richard Fant, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/127,846

(22) Filed: Aug. 3, 1998

(51) Int. Cl.[7] ............................................. H04L 12/28
(52) U.S. Cl. ...................................... 370/400; 370/466
(58) Field of Search ................................. 370/389, 400, 370/466–469, 470, 464; 375/229–231, 222–225, 357, 211, 220, 101–104, 200; 710/128, 100, 112, 328; 709/200, 230, 239, 221, 250, 220, 328; 713/200, 300

(56) References Cited

U.S. PATENT DOCUMENTS

| | | | | |
|---|---|---|---|---|
| 5,991,520 A | * | 11/1999 | Smyers et al. | 710/100 |
| 6,021,158 A | * | 2/2000 | Schurr et al. | 375/211 |
| 6,061,746 A | * | 5/2000 | Stanley et al. | 710/101 |
| 6,088,364 A | * | 7/2000 | Tokuhiro | 370/466 |
| 6,134,662 A | * | 10/2000 | Levy et al. | 713/200 |
| 6,134,665 A | * | 10/2000 | Klein et al. | 713/300 |
| 6,154,465 A | * | 11/2000 | Pickett | 370/466 |

* cited by examiner

Primary Examiner—Wellington Chin
Assistant Examiner—Prenell Jones
(74) Attorney, Agent, or Firm—McDermott, Will & Emery

(57) ABSTRACT

A network architecture uses an IEEE 1394-compliant network medium to connect computers using network-based software, such as Windows NDIS, Novell IPX, or TCP/IP. Each network includes a high-speed local area network driver that translates function calls from network/layer routines received across in application programming interface to a command set compliant with IEEE 1394. Hence, the computer network can be established using an IEEE 1394-compliant medium, providing a high-speed network have data rates above 200 MB/s.

36 Claims, 4 Drawing Sheets

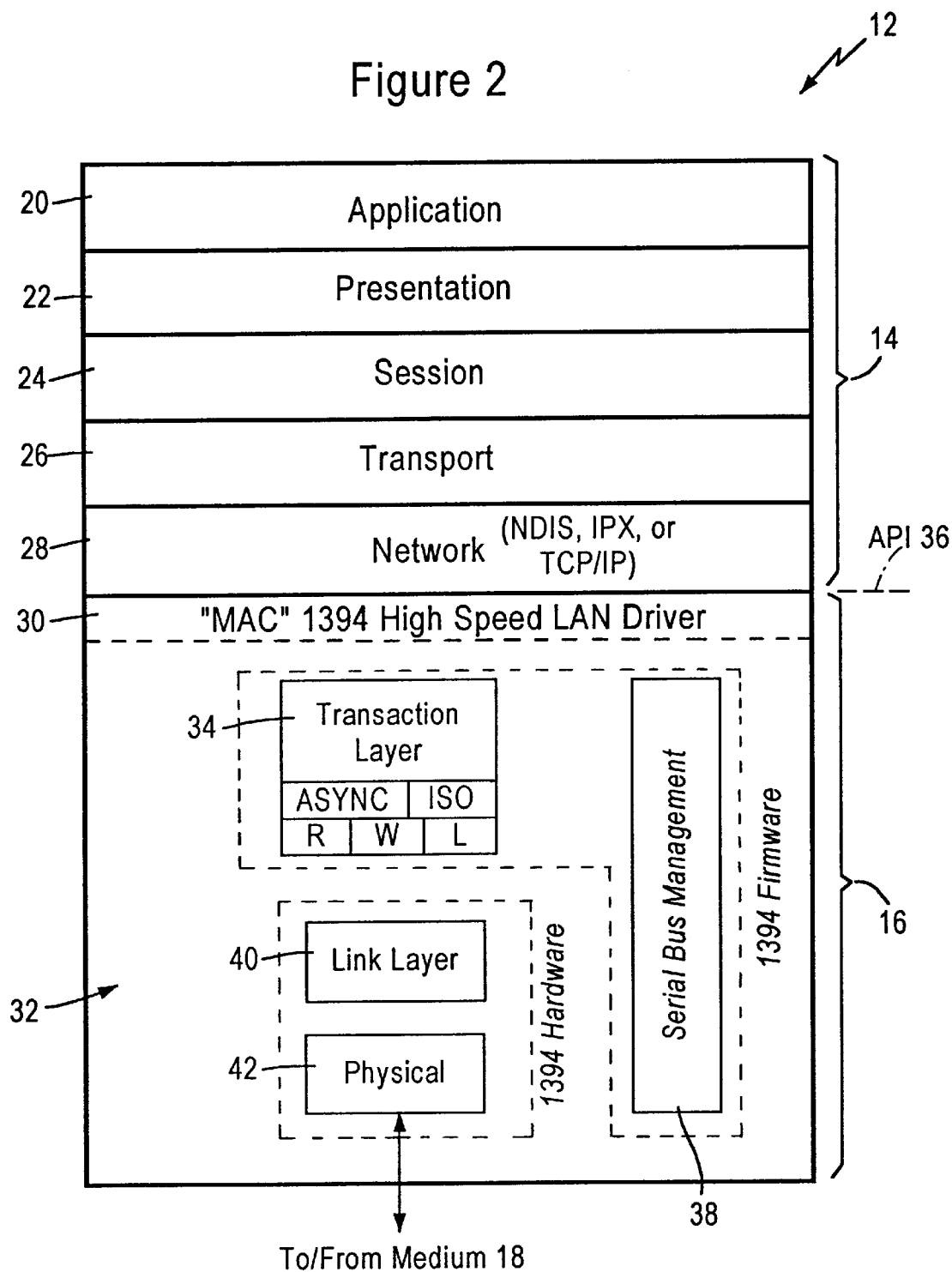

1

SYSTEM FOR TRANSMITTING DATA PACKETS BETWEEN COMPUTERS VIA AN IEEE-1394 NETWORK MEDIUM

TECHNICAL FIELD

The present invention relates to network interfacing, and more particularly, to methods and systems for controlling data traffic on high speed network media for a local area network.

BACKGROUND ART

Local area networks use a network cable or other media to link stations on the network. Each local area network architecture uses a Media Access Control (MAC) enabling network interface cards at each station to share access to the media.

The Ethernet protocol ISO/IEC 8802-3 (ANSI/IEEE standard 802.3) defines a half-duplex media access mechanism that permits all stations to access the network channel with equality. Deployment of IEEE 802.3 requires establishment of a physical layer interface capable of transmitting packet data at data rates of at least 10 megabits per second (MB/s). The IEEE 802.3 committee developed a series of specifications for 10 MB/s Ethernet to support different kinds of media. Initially the original Ethernet was only supported over thick coaxial cable. Next came thin coaxial cable, referred to as "Cheapernet", then Unshielded Twisted Pair (UTP), and fiber optic cable. A standard was established for optical fiber-based transport at 100 MB/s, referred to as the Fiber Distributed Data Interface (FDDI) suite of standards. The FDDI standard, while accepted as a technology, required a relatively high cost due to implicit features such as redundancy and sophisticated mandatory management. Hence, FDDI was largely restricted to deployment in backbone applications.

The adoption of IEEE 10BASE-T for 10 MB/s Ethernet over Unshielded Twisted Pair enabled implementation of 10 B/s Ethernet in buildings using relatively inexpensive twisted pair cable. The availability of simple and inexpensive and Ethernet connectivity coincided with the accelerating trend to distribute high-performance computing power to the desk top, resulting in increased bandwidth needs.

Development of a 100BASE-T product resulted in a cost premium over 10 B/s devices. In particular, 10 BASE-T requires only two pairs of category 3 cable to operate, whereas 100 MB/s requires use of category 5 cable, which is substantially more expensive than category 3.

Separate from the development of computer networking technology, the IEEE 1394 high performance serial bus standards referred to as "Fire Wire" was adopted for connecting a consumer electronic device to a personal computer. The IEEE 1394 serial bus is an open standard for connecting computers to a consumer electronic product, for example a television, a vcr, and a camcorder. The IEEE-1394 product standard are currently-being applied to consumer electronic applications. However, IEEE-1394 only describes the physical and data link layer of the OSI protocol model.

DISCLOSURE OF THE INVENTION

There is a need for an arrangement for increasing the bandwidth and a local area network without the necessity of high cost physical media technologies.

There is also a need for an arrangement to enable an IEEE 1394-compliant medium to be used to connect computers for establishment of a local area network for controlling communication between at least two computers according to a prescribed data protocol.

These and other needs are attained by the present invention, where an interface enables protocol translation between conventional network protocols and the IEEE 1394 high performance serial bus, enabling the IEEE 1394 compliant medium to be used as a high speed serial bus between two networked computers.

According to one aspect of the present invention, a local area network includes an IEEE 1394-compliant medium, and at least two computers. Each network computer includes network software executable by the corresponding computer for controlling communication between the two computers according to prescribed data protocol. Each computer also includes an IEEE 1394 compliant network interface, for establishing the communication between the two computers via the IEEE 1394-compliant medium. The network interface includes a media access control driver, configured as an interface between the network software, and the IEEE 1394-complaint hardware and the network interface. Hence, a relatively high-speed data network can be implemented in a low cost manner.

Another aspect of the present invention provides a method for transmitting packet data between a first computer and a second computer. The method includes sending a transmit request in the first computer for transmit packet from a network layer controller according to a prescribed media access controller protocol, translating the transmit request from the media access controller protocol for a selected one of asynchronous data transfer protocol and an isochronous data transfer protocol, and outputting the transmit data onto a network medium to the second computer based on the selected one data transfer protocol. The translation of the transmit request enables the first computer to output the transmit data based on a selected data transfer protocol. Hence, conventional network protocols may be used in an enhanced media access protocol that enables the same network to use isochronous data transport for guaranteed delivery of multiple time-critical multi-media data streams, or asynchronous data transport for less critical data transport requirements.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein:

FIG. 2 is a diagram illustrating an architecture in a computer for establishing communication using network software and an IEEE 1394-complaint medium according to an embodiment of the present invention.

BEST MODE FOR CARRYING OUT THE INVENTION

Figure 1:
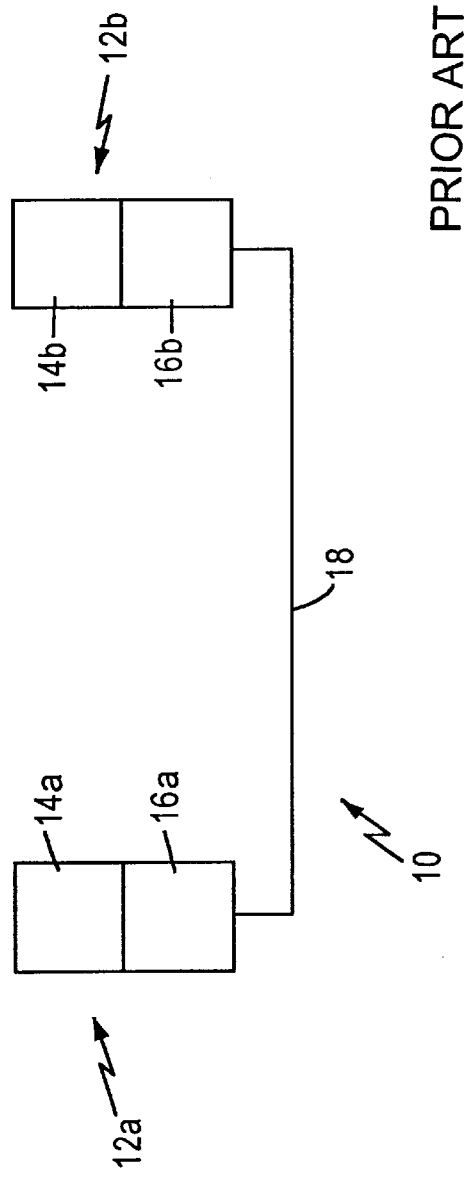
FIG. 1 is a block diagram illustrating a network having an IEEE 1394-compliant medium for transmitting data packets between two computers according to an embodiment of the present invention.

FIG. 1 is a diagram illustrating a local area network having at least two computers and communicating via an IEEE 1394-compliant medium according to embodiment of the present invention. In particular, the network 10 includes computers 12a and 12b, for example Windows 95-based computers, each having a network software portion 14 and IEEE 1394-compliant network interface portion 16. The network interfaces 16 establish communication between the two computers 12 via an IEEE 1394 compliant medium 18.

As described below, the network software portion 14 is compliant with the upper layer protocols of existing network architecture systems based on the ISO Open Systems Interconnection (OSI) reference model, illustrated in part in FIG. 2. Hence, each computer 12 operates by execution of existing Windows-based operating systems, and uses existing network software executable by the computer for controlling communication for between the two computers 12, for example Microsoft Network Driver Interface Standard (NDIS), Novell Internetwork Packet Exchange (IPX), or Transmission Control Protocol/Internet Protocol (TCP/IP).

As described below, the network interface 16 includes a media access control driver configured for receiving messages from the corresponding layer 14 according to the prescribed data network protocol, and converting the message from the prescribed data network protocol (e.g., NDIS, IPX, or TCP/IP) to a command set in compliance with IEEE 1394. The network interface then sends and receives data packets via the IEEE 1394-compliant medium 18, enabling transmission of higher rate data in a low cost manner.

FIG. 2 is a block diagram illustrating in detail the architecture of the computer system 12 of FIG. 1. As shown in FIG. 2, the network software executable by the corresponding computer includes an application layer 20, a presentation layer 22, a session layer 24, a transport layer 26, and a network and data link layer 28. The application layer 20 provides communications services to applications such as FTP, Telenet, SMTP and NFS related to this layer. The presentation layer 22 handles syntax, i.e., the rules that govern the format of data. Functions such as encoding and decoding character sets and selection of the rules to be used are the responsibilities of the presentation layer 22. The session layer 24 controls data transfer, and handles error recovery. Various management functions may also be performed by the session layer 24. The transport layer 26 performs three major functions that support the transparent transfer of data to and from the session layer 24, namely establishing and connection of the appropriate type and quality (e.g., speed), initiating data transfer and management the data to be sent, and releasing the connection.

The network and data link layer 28 is responsible for functions such as routing data between addresses, controlling the flow of data, and assembling incoming frames into blocks of data and segmenting blocks of data to be sent into frames. The network and data link layer 28 insures that whole messages are sent and received. As described above, the network and data link layer 28 may be implemented using Microsoft NDIS, Novell IPX, Microsoft IPX, or TCP/IP protocol. In the case of TCP/IP protocol, the network and data link layer 28 adds IP information before passing the packet from the transport layer 26 to the data link and physical layers of the OSI reference model, shown in FIG. 2 that corresponding to the network interface in 16.

Hence, the network and data link layer 28 provides independence from data transfer technology and relaying and routing considerations. The network and data link layer 28 also masks peculiarities of data transfer medium from higher layers and provides switching and routing functions to establish, maintain, and terminate network layer connections and transfer data between users.

The network driver 28, when executed using Windows NDIS protocol, is also referred to as a Media Access Control (MAC) driver that is configured for sending a media access control function call to a media access control across an application programming interface (API) 36 according to a prescribed data network protocol. In particular, the function calls performed by the NDIS driver in the network and data link layer 28 are grouped in the categories of transmission, reception, indications, and general requests.

Transmissions occur when the network and data link layer 28 transmits data to the lower layer, namely the MAC layer 30, described below. The MAC is passed the location in common memory when the data is stored. The MAC 30 may send the data onto the physical layer either immediately (i.e., synchronously), or it may save the data for later transmission (asynchronously). The MAC layer 30 notifies the network and data link layer 28 upon successful completion of its own transmission to the physical layer.

The reception function calls by the NDIS driver involve reception of data via the MAC 30 by the physical layer 32. According to NDIS protocol, when the MAC layer 30 has received data from the physical layer 32 (i.e., via the network medium 18), and wants the data to be sent to the network and data link layer 28, the MAC 30 will notify the network and data link layer 28 via an "indication", which is a special type of status message that such data is available. The status message will also include the location in common memory where part or all of the data is stored. If the network and data link layer 28 decides to keep the new data, the network and data link layer 28 will either copy the data, or request the MAC layer 30 to copy the data for the network and data link layer 28. If the network and data link layer 28 decides to reject the data, the network and data link layer 28 will so notify the MAC layer 30.

General requests according to NDIS protocol are general requests by the network and data link layer 28 to the MAC 30, requesting that the MAC 30 perform general functions such as open or close the network adapter, change the station address, reset the adapter, or run self diagnostics on the adapter.

Hence, the network and data link layer 28 sends and exchanges messages with the MAC layer 30 according to the prescribed data network protocol, such as Microsoft NDIS, Novell IPS, or TCP/IP. As described below, the message may be in the form of a transmit request for a transmit packet according to a prescribed MAC protocol used by the network layer.

As shown in FIG. 2, the MAC layer 30 is configured as an IEEE 1394 high speed local area network (LAN) driver that receives a media access control function call from the network and data link layer 28 across the application programming interface 36 according to the network layer protocol. As described below with reference to FIGS. 4A–4C, the driver 30 serves as a data link driver configured for converting the media access control function call received across the API 36 from the prescribed data network protocol (e.g., NDIS, IPX or TCP/IP) and to an IEEE 1394 compliant function call. Hence, the driver 30 translates the request from the media access controller protocol used by the network layer 38 to the IEEE 1394 protocol.

As shown in FIG. 2, the network interface 16 includes the MAC layer 30, plus a transaction layer 34, a serial bus management portion 38, a link layer 40, and a physical layer 42. According to the disclosed embodiment, the transaction layer 34 and the serial bus management layer 38 are implemented in firmware whereas the link layer 40 and the physical layer 42 are implemented in hardware. The physical layer 42 translates logical symbols used by the link layer 40 into electrical signals on the physical media 18. The physical layer 42 guarantees that only one node 12 at a time is sending data by providing an arbitration service. The physical layer 42 also defines the mechanical interfaces for the physical media 18.

The link layer 40 provides an acknowledged datagram, (i.e., a one-way data transfer with configuration of request) to the transaction layer 34. The link layer 40 provides addressing, data checking, and data framing for transmission and reception. The transaction layer 34 defines a complete request-response protocol to perform the operations of Read (R), Write (W), and Lock (L).

The transaction layer 34 control two types of data transfer services, in compliance with IEEE 1394, namely asynchronous (ASYNC) data transfer, and isochronous (ISO) data transfers. The asynchronous data transfer service provides a packet delivery protocol for variable length packets to an explicit address and return of an acknowledgement. The isochronous data transfer services provides a broadcast packet delivery protocol for variable-length packets that are transferred at regular intervals. For read transfers, data at a particular address within a responder is transferred back to a requester. For write operations, data is transferred from a requester to an address within one or more responders. For lock transfers, data is transferred from a requester to a responder, processed with data at a particular address within the responder, and then transferred back to the requester.

The Serial Bus Management Unit 38 manages serial communications on the medium 18 based on execution of the transaction layer 34 of the function called from the MAC driver 30.

Figure 3:
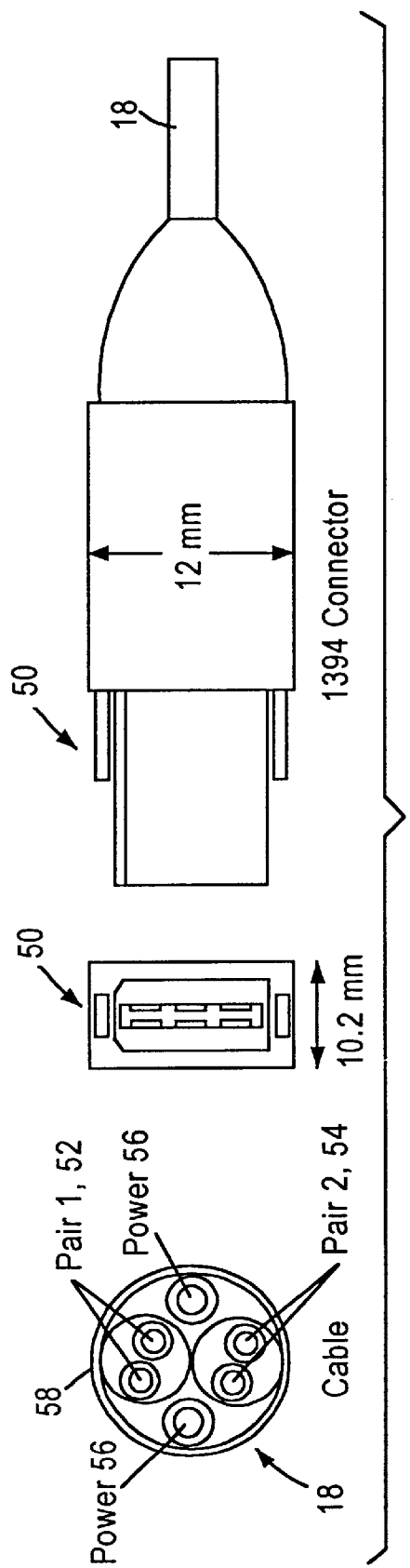
FIG. 3 is a diagram illustrating in detail the IEEE 1394-compliant medium.

FIG. 3 is a diagram of the IEEE 1394 medium 18 according to an embodiment of the present invention. In particular, the medium 18 is composed of a 6-conductor cable assembly containing two separately-shielded transmission lines 52, 54 for signaling, two power conductor 56 and an overall shield 58. The two twisted pairs 52, 54 are crossed in each cable assembly to create a transmit-receive connection. The power conductors (8 to 40 volts, 1.5 amperes maximum) supply power to the physical layer 42 in isolated devices. The cable 18 is terminated by a "gameboy" like connector 50, which plugs into the computer 12. According to the IEEE 1394 standard, the cable medium 18 can transport 400 MB/s over 4.5 meters. It is anticipated that use of the above-described architecture will enable data rates on the order of 3.2 Gigabytes per second. Although the distance between the two network stations is relatively limited, the disclosed arrangement has particularly beneficial advantages for a short-haul, high-speed network.

Figure 4A:
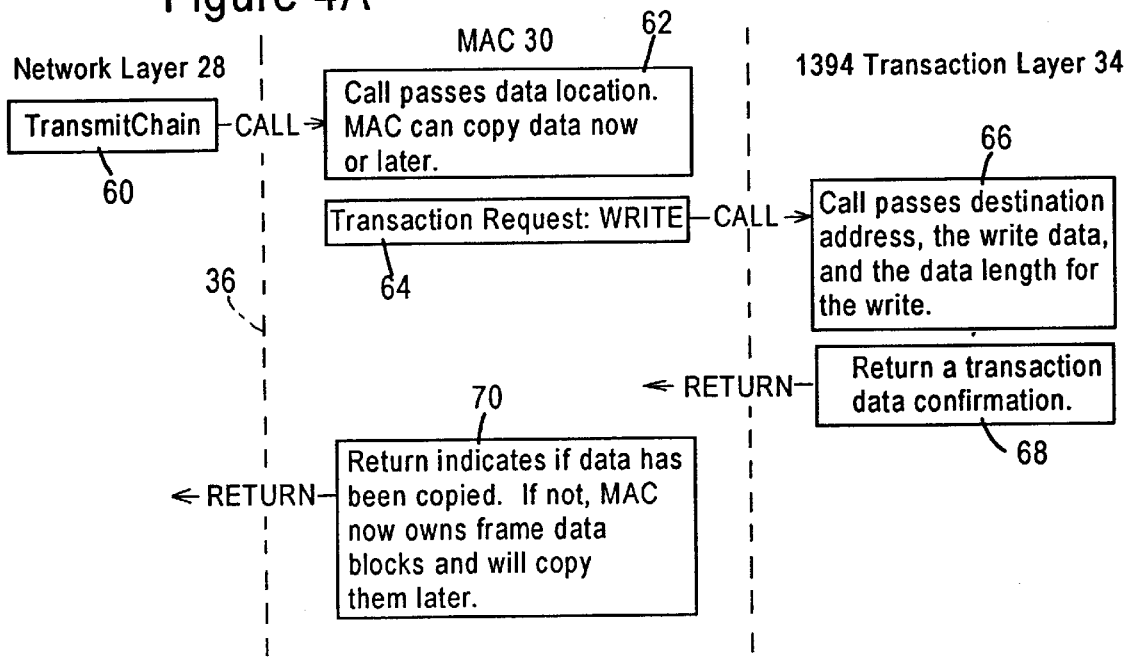
FIGS. 4A, 4B and 4C are flow diagrams illustrating transmission and reception of data between network software and the IEEE 1394-compliant medium according to an embodiment of the present invention.
Figure 4B:
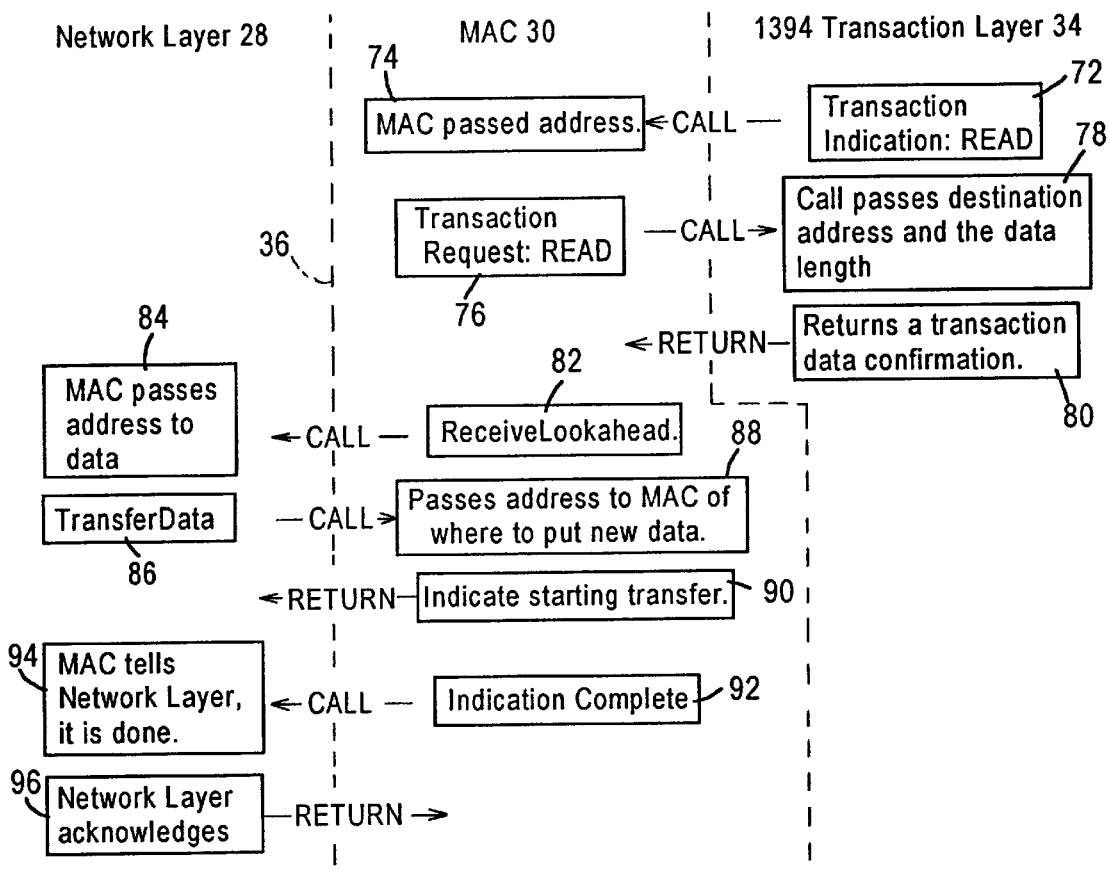
Figure 4C:
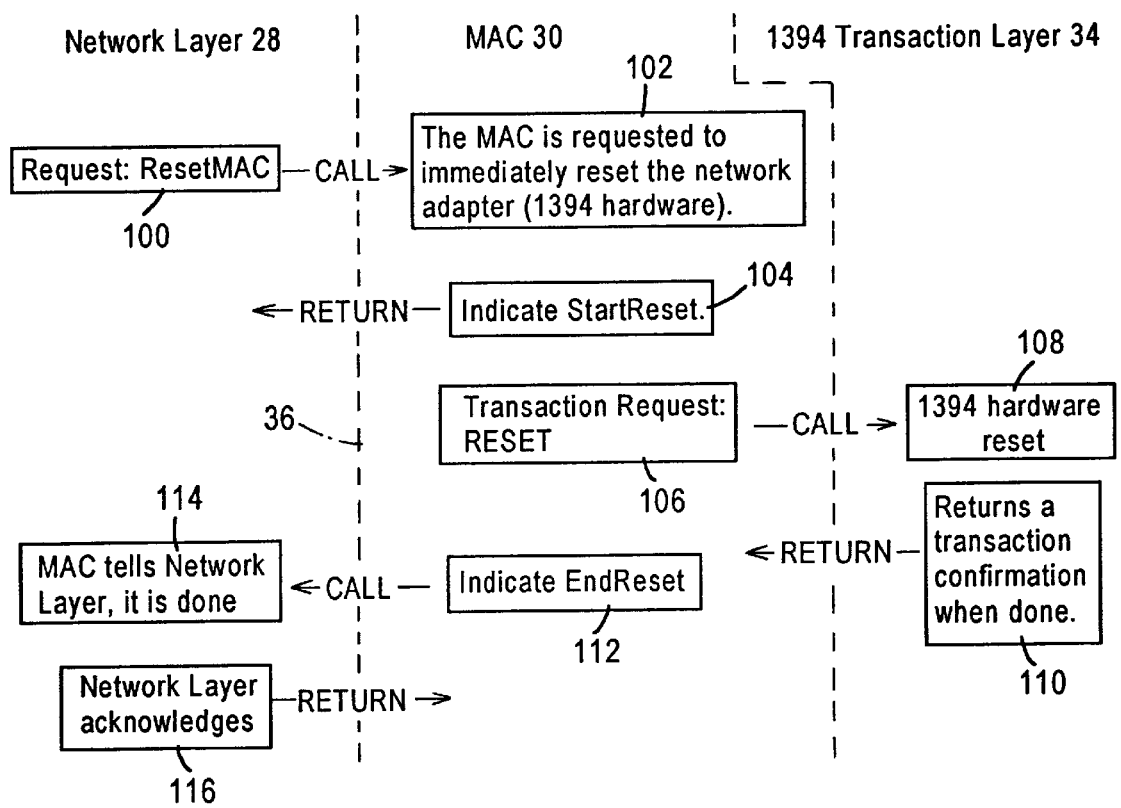

FIGS. 4A, 4B, and 4C are examples of function calls between the network and data link layer 28, the MAC layer 30, and the transaction layer 34. FIG. 4A is a diagram illustrating a mapping from NDIS to IEEE 1394 protocol of a transmission of a network and data link layer 28 to the 1394 transaction layer 34 according to an embodiment of the present invention. As shown in FIG. 4A, a transmit frame operation in node 12a is performed by the network and data link layer 28 by outputting a "transmit chain" function call in step 60 across the API 36 to the MAC layer 30.

The MAC layer 30 receives the data location of the transmit data in step 62 and decides whether to perform isochronous data transfer (immediate) or asynchronous data transfer at a later time. The MAC layer 30 then generates a "write" transaction request in step 64 based on asynchronous or isochronous transfer protocol, and issues the request to the transaction layer 34 in compliance with IEEE 1394 protocol. The transaction layer 34 in response passes the destination address with the write data, and the data link for the write in step 66 to the corresponding network node (e.g., station 12b) via the network medium 18.

Upon receiving the transaction data confirmation in step 68 from the network station 12b via the medium 18, the transaction layer 34 returns the transaction data confirmation to the MAC layer 30. The MAC layer 30, in response determines in step 50 if data has been copied and notifies the network and data link layer 28. If the data had not been copied, the MAC 30 owns the frame data blocks and reserves the data block for copying at a later time.

FIG. 4B is a diagram illustrating a mapping translation for reception from the IEEE 1394 transaction layer 34 to the network and data link layer 28. As shown in FIG. 4B, the transaction indication layer 34 issues a read transaction in step 72, passing the address to the MAC layer 30 in step 74. The MAC layer 30 in response issues a read transaction request to the transaction layer 34 in step 76, causing the transaction layer 34 to pass destination address and data link information in step 78 to the transmission network node 12b. Upon receiving a transaction data confirmation in step 80 via the media 18, the transaction layer 34 sends the confirmation to the MAC 30 in step 80. The MAC layer 30 in response issues a receive look ahead function call to the network and data link layer 28 across the API 36 in step 82, indicating the presence of received data. The network and data link layer 28 receives the address in step 84, and in response issues a transfer data function call in step 86 to the MAC 30, at which point the MAC receives in step 88 the system address of where to write the received data. The MAC 30 then writes the data to system memory and sends a return indicating the transfer is begun in step 90. Once the data transfer is complete by the MAC layer 30, the MAC layer 30 sends a transfer complete message in step 92 to the network and data link layer 28. The network and data link layer 28, in response to detecting completion in step 94, acknowledges the completion in step 96.

FIG. 4C is a diagram illustrating a mapping for a general request from the network and data link layer 28 to the 1394 transaction layer 34. As shown in FIG. 4C, the network and data link layer 28 generates a reset MAC request in step 100. The MAC layer 30, in response to receiving the request in step 102, indicates a start reset status message in step 104 to the network and data link layer 28 in accordance with NDIS protocol. The MAC 30 then generates the transaction request for a reset in step 106 in compliance with IEEE 1394 protocol to the transaction layer 34. The transaction layer 34 initiates a hardware reset in step 108, and returns a confirmation in step 110 when the reset operation is complete. The MAC 30 in response indicates an end reset in step 112 to the network and data link layer 28 indicating to the network and data link layer 28 in step 114 that the reset operation is completed. The network and data link layer 28 then sends an acknowledgement in step 116 to the MAC layer 30.

According to the disclosed embodiment, a high speed data link driver is configured for converting a media access control function call received across an application programming interface from the network software and converting the function all into an IEEE 1394-compliant function call.

Hence, the data link driver serves as a virtual media access controller, enabling the use of non standard physical media in network systems conventionally configured for packet medium technologies.

Although this invention has been described in connection with what has presently considered to be the most practical and preferred embodiment, it is to be understood that the invention is not limited to the disclosed embodiment, but on the contrary, it is intended to cover various modification and equivalent arrangements included within the spirit and scope of the appended claims.

What is claimed is:

1. A local area network comprising:
an IEEE 1394-compliant medium; and
at least two computers, each computer comprising:
(a) network software executable by the corresponding computer for controlling communication between the at least two computers according to a prescribed data network protocol; and
(b) an IEEE 1394-compliant network interface for establishing the communication between the at least two computers via the IEEE 1394-compliant medium, the network interface exchanging messages between the corresponding network software according to the prescribed data network protocol, wherein
the network software is compliant with the upper layer protocols of existing network architecture systems based on the International Standards Originzation (ISO) Open Systems Interconnection (OSI) reference model, and
the network interface includes a data link driver configured for converting the media access control function call received across the application programming interface from the prescribed data network protocol into an IEEE 1394-compliant function call.

2. A local area network comprising:
an IEEE 1394-compliant medium; and
at least two computers, each computer comprising:
(a) network software executable by the corresponding computer for controlling communication between the at least two computers according to a prescribed data network protocol; and
(b) an IEEE 1394-compliant network interface for establishing the communication between the at least two computers via the IEEE 1394-compliant medium, the network interface exchanging messages between the corresponding network software according to the prescribed data network protocol, wherein
the network software includes a media access control driver configured for sending a media access control function call to a media access controller across an application programming interface according to the prescribed data network protocol.

3. The local area network of claim 2, wherein the network interface includes a data link driver configured for converting the media access control function call received across the application programming interface from the prescribed data network protocol into an IEEE 1394-compliant function call.

4. The local area network of claim 3, wherein the network interface further includes an IEEE-1394 compliant transaction layer for executing the IEEE-1394 compliant function call, the transaction layer supplying a response to the data link driver based on execution of the IEEE-1394 compliant function call.

5. The local area network of claim 4, wherein the network interface further comprises a serial bus management for managing serial communications on the medium based on execution by the transaction layer of the IEEE 1394-compliant function call.

6. The local area network of claim 5, wherein the network interface sends and receives data packets via the medium at a data rate of about 200 MB/s.

7. The local area network of claim 5, wherein the network interface further comprises a link layer, controlled by the serial bus management, for detecting a presence of a valid link on the network medium.

8. The local area network of claim 4, wherein the transaction layer generates one of a read request, a write request, and a lock request for the other computer based on execution of the IEEE-1394 compliant function call.

9. The local area network of claim 4, wherein the transaction layer selectively generates a response to one of a read request, a write request, and a lock request received from the other computer based on execution of the IEEE-1394 function call.

10. The local area network of claim 2, wherein the media access control driver is an NDIS driver.

11. The local area network of claim 2, wherein the media access control driver is a Novell IPX driver.

12. The local area network of claim 2, wherein the media access control driver is a TCP/IP based driver.

13. The local area network of claim 1, wherein the network interface outputs data packets according to a selected one of an asynchronous data transfer protocol and an isochronous data transfer protocol based on the messages from the corresponding network software.

14. A method for transmitting packet data between a first computer and a second computer, the method comprising:
in the first computer:
sending a transmit request for a transmit packet from a network layer controller according to a prescribed media access controller protocol;
translating the transmit request from the media access controller protocol for a selected one of an asynchronous data transfer protocol and an isochronous data transfer protocol; and
outputting the transmit data onto a network medium to the second computer based on the selected one data transfer protocol.

15. The method of claim 14, further comprising:
in the second computer:
receiving the transmit packet from the network medium; and
selectively outputting a second transmit data in response to the received transmit packet.

16. The method of claim 15, wherein the selectively outputting step includes outputting an acknowledgement frame as the second transmit data to the first computer.

17. The method of claim 15, wherein the selectively outputting step includes outputting a frame of data, from an addressed location specified by the received transmit packet, as the second transmit data to the first computer.

18. The method of claim 14, wherein the outputting step includes outputting the transmit data as one of a read request, a write request, and a lock request.

19. The method of claim 14, wherein the outputting step includes outputting the transmit data according to IEEE 1394 protocol.

20. The method of claim 19, wherein the sending step includes sending the transmit request according to one of Microsoft NDIS protocol, Novell IPX protocol, and TCP/IP protocol.

21. A computer readable medium bearing instructions for outputting transmit data, the instructions arranged, when executed, to cause at least one processor in a first computer to perform the steps of:

receiving a transmit request for transmit data from a network layer controller executed by the processor and according to a prescribed media access controller protocol;

translating the transmit request for a selected one of an asynchronous data transfer protocol and an isochronous data transfer protocol; and outputting the transmit data onto a network medium to the second computer based on the selected one data transfer protocol.

22. The medium of claim 21, wherein the outputting step includes outputting the transmit data as one of a read request, a write request, and a lock request.

23. The medium of claim 21, wherein the outputting step includes outputting the transmit data according to IEEE 1394 protocol.

24. The medium of claim 23, wherein the sending step includes sending the transmit request according to one of Microsoft NDIS protocol, Novell IPX protocol, and TCP/IP protocol.

25. A local area network comprising:

a network medium; and at least two computers, each computer comprising:
(a) network software executable by the corresponding computer for controlling communication between the at least two computers according to a prescribed data network protocol; and
(b) a network interface for establishing the communication between the at least two computers via the medium according to a selected one of an asynchronous data transfer protocol and an isochronous data transfer protocol, the network interface exchanging messages between the corresponding network software according to the prescribed data network protocol, wherein the network software is compliant with the upper layer protocols of existing network architecture systems based on the International Standards Originzation (ISO) Open Systems Interconnection (OSI) reference model, and the network interface includes a data link driver configured for converting the media access control function call received across the application programming interface from the prescribed data network protocol into an IEEE 1394-compliant function call.

26. A local area network comprising:

a network medium; and at least two computers, each computer comprising:
(a) network software executable by the corresponding computer for controlling communication between the at least two computers according to a prescribed data network protocol; and
(b) a network interface for establishing the communication between the at least two computers via the medium according to a selected one of an asynchronous data transfer protocol and an isochronous data transfer protocol, the network interface exchanging messages between the corresponding network software according to the prescribed data network protocol, wherein the network interface establishes the communication according to IEEE 1394 protocol, and the network software includes a media access control driver configured for sending a media access control function call to a media access controller across an application programming interface according to the prescribed data network protocol.

27. The local area network of claim 26, wherein the network interface includes a data link driver configured for converting the media access control function call received across the application programming interface from the prescribed data network protocol into an IEEE 1394-compliant function call.

28. The local area network of claim 27, wherein the network interface further includes an IEEE-1394 compliant transaction layer for executing the IEEE-1394 compliant function call, the transaction layer supplying a response to the data link driver based on execution of the IEEE-1394 compliant function call.

29. The local area network of claim 28, wherein the network interface further comprises a serial bus management for managing serial communications on the medium based on execution by the transaction layer of the IEEE 1394-compliant function call.

30. The local area network of claim 29, herein the network interface sends and receives data packets via the medium at a data rate of about 200 MB/s.

31. The local area network of claim 29, wherein the network interface further comprises a link layer, controlled by the serial bus management, for detecting a presence of a valid link on the network medium.

32. The local area network of claim 28, wherein the transaction layer generates one of a read request, a write request, and a lock request for the other computer based on execution of the IEEE-1394 compliant function call.

33. The local area network of claim 28, wherein the transaction layer selectively generates a response to one of a read request, a write request, and a lock request received from the other computer based on execution of the IEEE-1394 function call.

34. The local area network of claim 26, wherein the media access control driver is an NDIS driver.

35. The local area network of claim 26, wherein the media access control driver is a Novell IPX driver.

36. The local area network of claim 26, wherein the media access control driver is a TCP/IP based driver.

* * * * *